Sept. 19, 1961 G. VOLOSSEVICH 3,000,484
DRIVING MEANS FOR A LIQUID FUEL INJECTION PUMP
Filed March 18, 1959 2 Sheets-Sheet 2

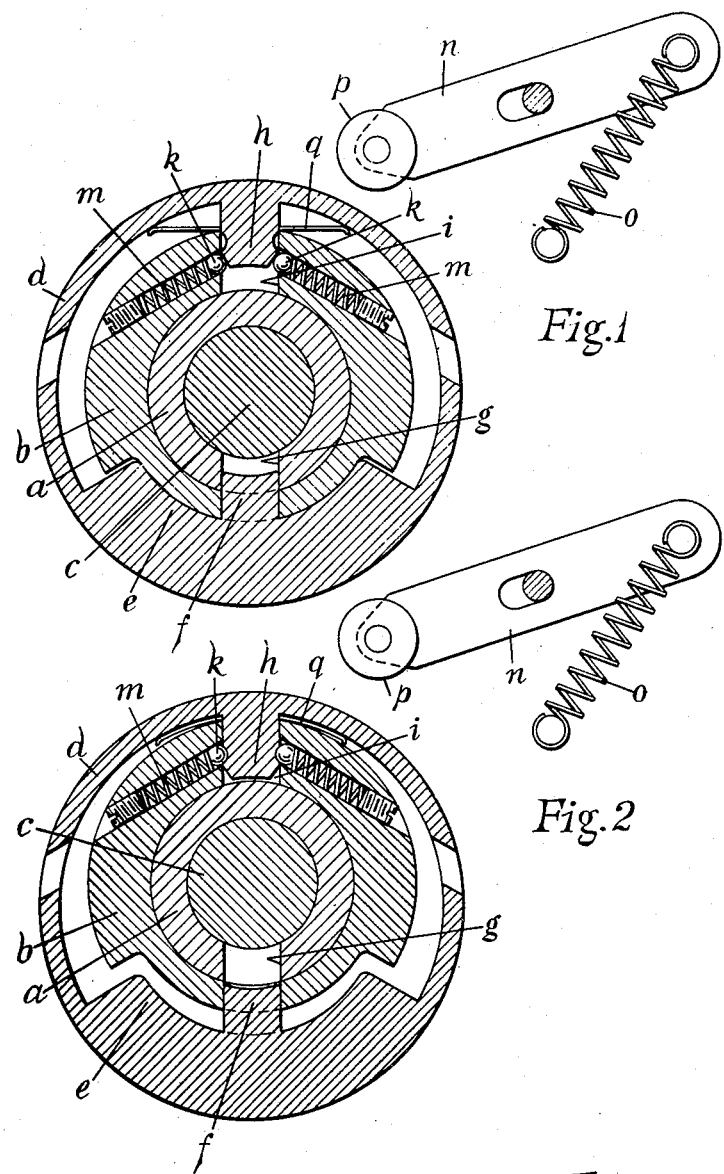

Inventor
G. Volossevich 3,000,484
DRIVING MEANS FOR A LIQUID FUEL
INJECTION PUMP
George Volossevich, West Kensington, London, England, assignor to C.A.V. Limited, London, England
Filed Mar. 18, 1959, Ser. No. 800,297
Claims priority, application Great Britain Mar. 19, 1958
1 Claim. (Cl. 192—104)

This invention relates to an injection pump of the kind for supplying liquid fuel to an internal combustion engine under the control of a speed responsive governor, and has for its object to provide a driving means for the pump which is adapted to isolate the pump from its source of motion in the event of the speed exceeding the range of control of the governor.

The invention comprises the combination of a two-part coupling, one part of which is adapted for attachment to the actuating shaft of the pump, and the other part of which is adapted for connection to the engine, a dynamically unbalanced ring surrounding the coupling, a radial detent carried by the ring for interconnecting the said parts of the coupling, and a spring-loaded catch interconnecting the ring and one of the coupling parts, the arrangement being such that the ring is movable radially under the action of centrifugal force and when so moved retracts the detent to an inoperative position.

In the accompanying drawings:

FIGURE 1 is a sectional end view illustrating in its operative condition a mechanism embodying the invention.

FIGURE 2 is a similar view to FIGURE 1 illustrating the mechanism in its inoperative condition.

Figure 3:
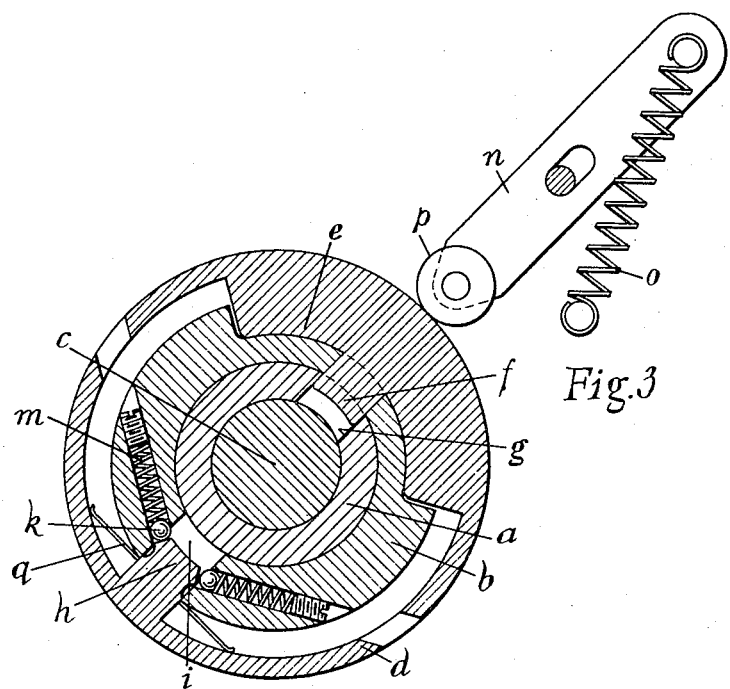
FIGURE 3 illustrates the mode of re-setting the mechanism from the condition shown in FIGURE 2 to that shown in FIGURE 1.

Referring to the drawings, the coupling for transmitting motion from the engine to the pump comprises a pair of coaxial parts $a$, $b$ respectively adapted for connection to the pump driving shaft $c$ and a shaft (not shown) driven by the engine. The coupling is surrounded by a metal ring $d$ of which the inner periphery is shaped to provide an unbalanced mass $e$ of segmental form. Also the periphery of the part $b$ has formed in it a segmental recess which can accommodate the mass $e$. On the part $e$ of the ring $d$ is formed or secured an inwardly extending radial detent $f$ which is slidable in a radial gap in the coupling part $b$ and adapted to engage a complementary gap $g$ in the coupling part $a$. Also at a diametrically opposite position is provided a catch. This comprises a radial detent $h$ formed on or secured to the ring $d$ and occupying another gap $i$ in the coupling part $b$. On the sides of this detent are formed recesses which are engaged by a pair of balls $k$ loaded by springs $m$ situated at opposite sides of the detent and contained in bores formed in the coupling part $b$.

The arrangement is such that the ring $d$ is held in its normal concentric position by the catch as shown in FIGURE 1, but in the event of the speed exceeding that of the upper limit of the range of action of the speed governor which controls the pump, the centrifugal force acting on the ring $d$ (due to the mass $e$ above-mentioned) moves the ring radially, so retracting the detent $f$ which interconnects the parts $a$, $b$, of the coupling as shown in FIGURE 2, and thereby isolating the pump from the engine, the ring being held in this position by the catch.

To assist the springs $m$ in resisting movement of the part $e$ due to centrifugal forces, a leaf spring $q$ may be engaged around the detent $h$ between the ring $d$ and the part $b$.

Re-starting of the engine is effected in the usual manner by an electric motor, and to effect re-setting of the ring $d$, while the engine is being re-started, there is pivoted on the pump a hand lever $n$ which is loaded by a spring $o$ and on which a roller $p$ is mounted for acting on the outer periphery of the ring $d$. On moving the roller by means of the lever into contact with the ring the pressure between the roller and the ring while the latter is rotating, causes the ring to be returned to its normal position as shown in FIGURE 3.

Having thus described my invention what I claim as new and desire to secure by Letters Patent is:

Driving means for a liquid fuel injection pump of the kind specificed, comprising in combination a two-part coupling consisting of a rotary driven part provided with a radial gap, and a rotary driving part coaxial with and surrounding the driven part and provided with diametrically opposite first and second radial gaps, a dynamically unbalanced ring surrounding the coupling and having rigid therewith diametrically opposite and inwardly extending first and second detents through the medium of which the ring is constantly connected to the driving part so as to be rotatable therewith, the first detent being slidable within the first radial gap in the driving part, the second detent being slidable within the second radial gap in the driving part into and out of engagement with the radial gap in the driven part for interconnecting and disconnecting the driving and driven parts in response to radial movement of the unbalanced ring during rotation of the ring by the driving part, and the ring having an unbalanced mass adjacent the second detent so that the ring is movable under the action of centrifugal force in the direction for disengaging the second detent from the radial gap in the driven part, and spring-loaded means carried by the driving part and acting on the first detent for preventing radial movement of the ring by centrifugal force until the rotary motion imparted to the ring by the driving part exceeds a predetermined speed, and for holdling the ring in the position in which the second detent is disengaged from the radial gap in the driven part.

References Cited in the file of this patent

UNITED STATES PATENTS 2,613,783     Maurer _____ Oct. 14, 1952

FOREIGN PATENTS 115,895     Germany _____ Nov. 16, 1900
879,988     France _____ Dec. 10, 1942